US011290517B2

(12) United States Patent
Sekimoto et al.

(10) Patent No.: US 11,290,517 B2
(45) Date of Patent: Mar. 29, 2022

(54) DISPLAY DATA PROVIDING APPARATUS INCLUDING APPLICATION SERVER CONFIGURED TO GENERATE DISPLAY DATA

(71) Applicant: FANUC CORPORATION, Yamanashi (JP)

(72) Inventors: Kouji Sekimoto, Yamanashi (JP); Hideo Ogino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/734,754

(22) Filed: Jan. 6, 2020

(65) Prior Publication Data

US 2020/0236155 A1 Jul. 23, 2020

(30) Foreign Application Priority Data

Jan. 22, 2019 (JP) .............................. JP2019-008339

(51) Int. Cl.
*H04L 29/08* (2006.01)
*H04L 29/06* (2006.01)
(Continued)

(52) U.S. Cl.
CPC .............. *H04L 67/02* (2013.01); *H04L 67/42* (2013.01)

(58) Field of Classification Search
CPC ................................ H04L 67/02; H04L 67/42
See application file for complete search history.

(56) References Cited

U.S. PATENT DOCUMENTS 5,880,955 A * 3/1999 Matoba ................. G06F 13/409
                                                                                                  700/17
6,249,817 B1 * 6/2001 Nakabayashi .......... H04L 29/06
                                                                                                  709/219

(Continued)

FOREIGN PATENT DOCUMENTS

| JP | 11-24716 | 1/1999 |
| JP | 2003-044397 A | 2/2003 |
| JP | 2015-031977 A | 2/2015 |

OTHER PUBLICATIONS

Notification of Reasons for Refusal dated Apr. 27, 2021 in JP Patent Application No. 2019-008339.

*Primary Examiner* — Alina A Boutah
(74) *Attorney, Agent, or Firm* — Wenderoth, Lind & Ponack, L.L.P.

(57) ABSTRACT

A display data providing apparatus includes an application server configured to generate display data, and a two-way communication WEB server which is configured to provide the display data generated by the application server to a display device, in response to a request from the display device, and which is configured to perform two-way communication with the display device. The application server includes a data update management unit configured to determine whether to update the display data, and a data generation unit configured to generate the display data if the data update management unit determines that the display data is to be updated. If the data update management unit determines that the display data is to be updated, the two-way communication WEB server provides the display data generated by the data generation unit to the display device, regardless of the request from the display device.

5 Claims, 4 Drawing Sheets

(51) Int. Cl.
    *H04L 67/02*   (2022.01)
    *H04L 67/01*   (2022.01)

(56) References Cited

U.S. PATENT DOCUMENTS

| | | | | |
|---|---|---|---|---|
| 6,502,132 B1* | 12/2002 | Kumano | ............... | H04L 43/065 709/224 |
| 6,823,359 B1* | 11/2004 | Heidingsfeld | .......... | H04L 29/06 709/203 |
| 7,539,785 B2* | 5/2009 | Kikuchi | .............. | G06F 11/3006 710/19 |
| 7,676,585 B1* | 3/2010 | Francke | ................ | H04L 67/306 709/229 |
| 7,899,902 B2* | 3/2011 | Hyotani | ................. | G06Q 10/10 709/224 |
| 8,082,077 B2* | 12/2011 | Nishida | .................... | G01D 7/02 701/36 |
| 8,346,852 B2* | 1/2013 | Sugasaki | ................. | H04L 12/66 709/203 |
| 8,386,661 B2* | 2/2013 | Ostrovsky | ........... | H04L 12/2814 710/15 |
| 8,798,485 B2* | 8/2014 | Park | .................... | G06F 11/0748 399/9 |
| 8,978,080 B2* | 3/2015 | Takahashi | ............. | G06F 3/1423 725/105 |
| 9,210,056 B1* | 12/2015 | Choudhary | ........... | H04L 43/045 |
| 9,374,412 B2* | 6/2016 | Yoshimura | ........... | G06F 9/5027 |
| 9,507,489 B2* | 11/2016 | Negoro | .............. | H04N 1/00506 |
| 9,575,742 B2* | 2/2017 | Kim | ........................ | G06F 8/65 |
| 9,749,282 B2* | 8/2017 | Jain | ................... | H04M 1/72566 |
| 9,762,454 B2* | 9/2017 | Bliss | ................. | G06F 3/04842 |
| 9,814,893 B2* | 11/2017 | Elghazzawi | ........... | G06F 16/23 |
| 9,996,310 B1* | 6/2018 | Bliss | ........................ | G10L 15/22 |
| 10,069,692 B2* | 9/2018 | Jeon | .................. | H04M 1/72569 |
| 10,158,536 B2* | 12/2018 | Kim | .................. | H04W 12/0401 |
| 10,262,359 B2* | 4/2019 | Koeppel | .............. | G06T 11/001 |
| 10,387,011 B2* | 8/2019 | Bliss | ................. | H04L 41/0873 |
| 10,492,060 B2* | 11/2019 | Choi | ................. | H04W 52/0216 |
| 10,534,342 B2* | 1/2020 | Nixon | ................. | G05B 19/045 |
| 10,609,114 B1* | 3/2020 | Bicket | ................ | H04L 41/0806 |
| 10,637,944 B2* | 4/2020 | Sone | ................... | H04L 67/025 |
| 10,715,567 B2* | 7/2020 | Lim | .................. | H04M 3/42365 |
| 2005/0204047 A1* | 9/2005 | Mitchell | ................. | H04L 67/02 709/228 |
| 2006/0015622 A1* | 1/2006 | Gungabeesoon | ........ | H04L 67/02 709/227 |
| 2006/0218223 A1* | 9/2006 | Uchida | ................... | H04L 67/26 709/201 |
| 2007/0266128 A1* | 11/2007 | Bhogal | ..................... | G06F 8/65 709/223 |
| 2010/0011135 A1* | 1/2010 | Jawa | ..................... | H04L 67/025 710/19 |
| 2010/0063998 A1* | 3/2010 | Nakamura | .......... | H04L 67/2842 709/203 |
| 2010/0115023 A1* | 5/2010 | Peled | ..................... | H04L 67/34 709/203 |
| 2010/0281406 A1* | 11/2010 | Yokogawa | ......... | H04N 5/44543 715/764 |
| 2010/0281498 A1* | 11/2010 | Tanemura | .......... | H04N 7/17318 725/25 |
| 2012/0042078 A1* | 2/2012 | Kroeger | ................. | G06F 16/40 709/226 |
| 2014/0026057 A1* | 1/2014 | Kimpton | .................. | G06F 9/451 715/733 |
| 2014/0207863 A1* | 7/2014 | Steinberg | ................ | H04L 67/02 709/204 |
| 2014/0357307 A1* | 12/2014 | Zwaal | ................. | H04W 4/029 455/457 |
| 2014/0372568 A1* | 12/2014 | Clark | ................. | H04L 65/4084 709/219 |
| 2015/0095456 A1* | 4/2015 | Shah | ....................... | G06F 16/13 709/217 |
| 2015/0095717 A1* | 4/2015 | Frenz | .................. | G06F 11/2294 714/46 |
| 2015/0109311 A1* | 4/2015 | Aoki | ........................ | G07G 1/14 345/520 |
| 2015/0134814 A1* | 5/2015 | Ishizaka | ............. | G06Q 10/0639 709/224 |
| 2015/0199079 A1* | 7/2015 | Negoro | .................... | H04L 67/02 715/760 |
| 2016/0163003 A1* | 6/2016 | Graham | ................. | H04L 65/403 715/739 |
| 2017/0126843 A1* | 5/2017 | Pantea | ...................... | G06F 8/38 |
| 2017/0228138 A1* | 8/2017 | Paluka | ................ | G06F 3/04845 |
| 2018/0107188 A1* | 4/2018 | Nixon | .................. | G05B 19/045 |
| 2019/0275676 A1* | 9/2019 | Jensen | .................. | B25J 9/1689 |
| 2020/0225631 A1* | 7/2020 | Takahashi | ........... | G05B 19/054 |

* cited by examiner ically control data in the numerical control unit 201 and I/C) data in the I/O control unit 202.
DISPLAY DATA PROVIDING APPARATUS INCLUDING APPLICATION SERVER CONFIGURED TO GENERATE DISPLAY DATA This application is based on and claims the benefit of priority from Japanese Patent Application No. 2019-008339, filed on 22 Jan. 2019, the content of which is incorporated herein by reference.

BACKGROUND OF THE INVENTION

Field of the Invention

The present invention relates to a display data providing apparatus.

Related Art

In some cases, a display device such as a PC, a tablet terminal or a smartphone is connected via a network to a numerical controller configured to control a machine, for example, a machine tool or a robot, so that the information relating to the numerical controller is able to be confirmed even at a location away from the machine tool.

In an example, such a numerical controller is provided with a display data providing apparatus configured to provide the display data relating to the numerical controller to the display device. Such a well-known display data providing apparatus includes a WEB server conforming to http (hypertext transfer protocol), and provides an html (hypertext markup language) file including a script in html, display data and the like to the display device. With such a configuration, the display device is able to display the display data by use of a general WEB browser (refer to, for example, Patent Document 1) (refer to FIG. 4).

Patent Document 1: Japanese Unexamined Patent Application, Publication No. H11-24716

SUMMARY OF THE INVENTION

In http, a display device (client) transmits a request to a WEB server by use of a WEB browser, and thereby acquires display data from the WEB server so as to display the display data on the WEB browser. The display device (client) needs to transmit a request periodically, in order to acquire the display data from the WEB server so as to update the display data to be displayed on the WEB browser. In this case, even in the case where the display data has not been updated, the display device needs to continuously transmit a request, and therefore useless communication processing is frequently performed between the display device and the display data providing apparatus.

Therefore, a display data providing apparatus reduced in a communication load is desired.

A display data providing apparatus in one aspect of the present disclosure is connected to a display device having a WEB browser, and configured to provide display data relating to a machine controller to the display device. The display data providing apparatus includes an application server configured to generate the display data, and a two-way communication WEB server which is configured to provide the display data generated by the application server to the display device, in response to a request from the display device, and to perform two-way communication with the display device. The application server includes a data update management unit configured to determine whether to update the display data, and a data generation unit configured to generate the display data in the case where the data update management unit determines that the display data is to be updated. In the case where the data update management unit determines that the display data is to be updated, the two-way communication WEB server provides the display data generated by the data generation unit to the display device, regardless of the request from the display device.

The display data providing apparatus according to one aspect of the present disclosure is capable of performing communication with a low load.

DETAILED DESCRIPTION OF THE INVENTION

Figure 1:
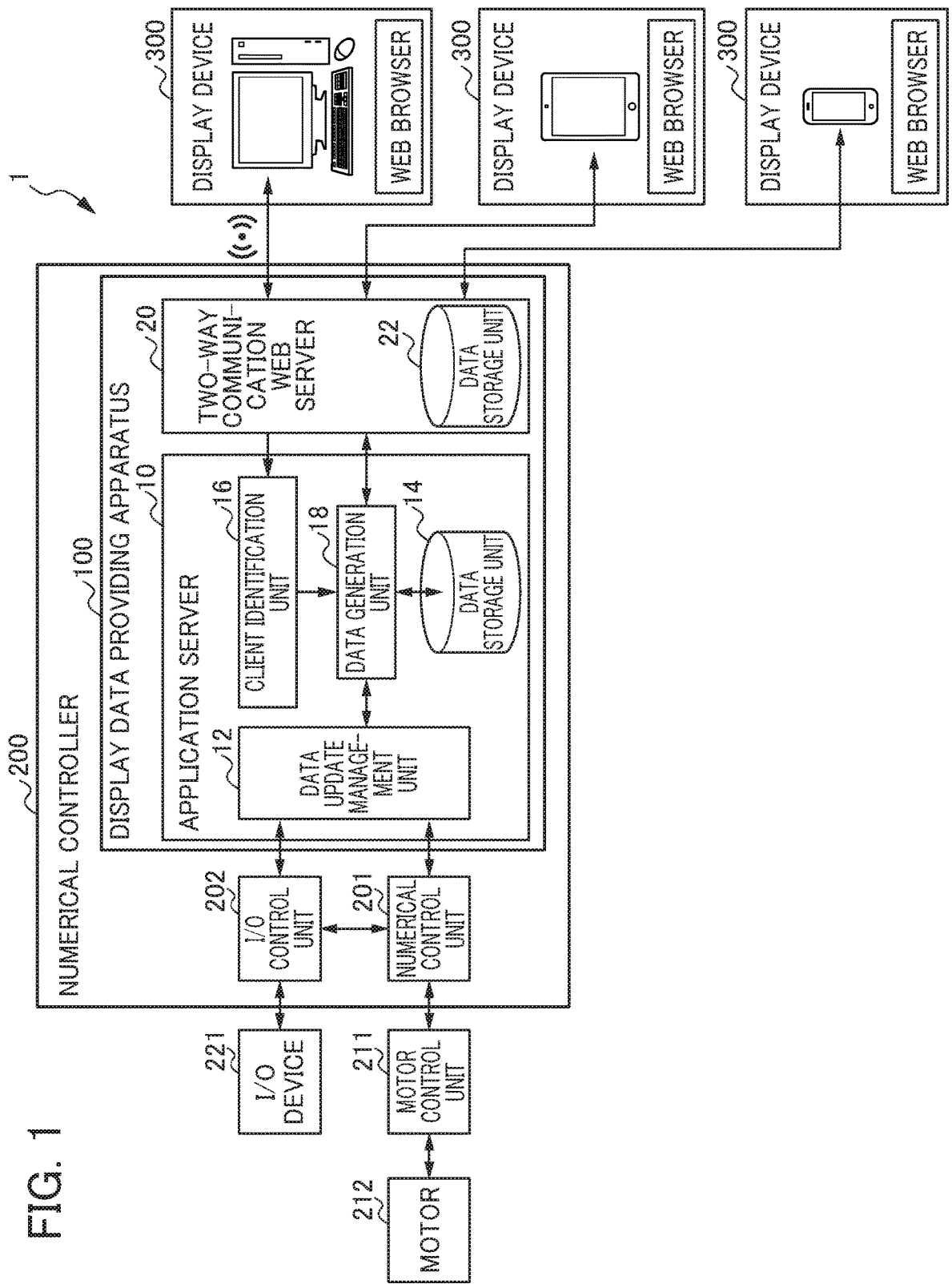
FIG. 1 is a diagram illustrating a configuration of a display data providing system including a display data providing apparatus according to the present embodiment.

One example embodiment according to the present invention will be described below by referring to the attached drawings. It is noted that the same or corresponding parts in the respective drawings are denoted by the same reference numerals.

(Display Data Providing System)

FIG. 1 is a diagram illustrating a configuration of a display data providing system including a display data providing apparatus according to the present embodiment. A display data providing system 1 shown in FIG. 1 includes a display data providing apparatus 100, a numerical controller 200 and three display devices 300. In the present embodiment, the display data providing apparatus 100 is provided in the numerical controller 200. The display data providing apparatus 100 and each of the display devices 300 are connected via a wired or wireless network.

The numerical controller 200, which is configured to control a machine such as a machine tool or a robot, includes a numerical control unit 201 and an I/O control unit 202. The numerical control unit 201 controls a motor control part 211 in the machine so as to control a motor 212 such as a servo motor or a spindle motor in the machine. The I/O control unit 202 exchanges I/O information of a PMC (programmable machine controller), with an I/O device 221.

The numerical controller 200 may include a display unit configured to display numerical control data in the numerical control unit 201 and I/C) data in the I/O control unit 202.

The display devices 300 are mutually different types of information terminals such as a PC, a tablet terminal and a smartphone, and are client terminals each on which a WEB browser is mounted. Each of the display devices 300 issues a request to read display data to the display data providing apparatus 100, by use of the WEB browser. Each of the display devices 300 acquires display data from the display data providing apparatus 100, and displays the display data on the WEB browser.

The display data providing apparatus 100 provides the display data relating to the numerical controller 200, to the display devices 300. The display data providing apparatus 100 is described below.

(Display Data Providing Apparatus)

The display data providing apparatus 100 includes an application server 10 and a two-way communication WEB server 20.

The application server 10 generates and manages the display data relating to the numerical controller 200. The application server 10 includes a data update management unit 12, a data storage unit (second data storage unit) 14, a client identification unit 16, and a data generation unit 18.

The data update management unit 12 periodically acquires and manages the display data relating to the numerical controller 200, specifically, the numerical control data of the numerical control unit 201 and the I/O data of the I/O control unit 202.

The numerical control data (display data) includes the information relating to the operation of the numerical controller 200, more specifically, at least one of the control parameters (for example, number of axes, names of axes, setting of acceleration/deceleration of respective axes) of the numerical control unit 201, the distributed pulse from the numerical control unit 201 to the motor 212 (for example, a servo motor or a spindle motor) of the machine, the feedback pulse from the motor 212 of the machine to the numerical control unit 201, and the abnormality notification alarm of the numerical control unit 201. The I/O data (display data) includes the information relating to the operation of the numerical controller 200, more specifically, the input/output signals of the PMC (programmable machine controller) in the I/O control unit 202.

The data update management unit 12 determines whether to update the acquired display data, specifically, the numerical control data and the I/O data in an example, in the case where the data update management unit 12 compares the latest display data with the display data transmitted last time to the display devices 300, and where the display data has been changed, the data update management unit 12 determines that the display data is to be updated.

The data storage unit 14 stores a script file. A script file includes an html file.

The client identification unit 16 identifies the display devices 300, on the basis of the information relating to the display devices acquired from the display devices 300, for example, client identification data such as OS types, display sizes and MAC addresses.

The data generation unit 18 generates display data suitable for respective types of the display devices 300 identified by the client identification unit. 16, on the basis of the display data acquired by the data update management unit 12, specifically, the numerical control data and the I/O data, and the script files stored in the data storage unit 14. The data generation unit 18 generates the display data in the case of receiving a request from each of the display devices 300. The data generation unit 18 generates the display data in the case where the data update management unit 12 determines that the display data, specifically, the numerical control data and the I/O data are to be updated.

The two-way communication WEB server 20 is configured to perform one-way communication conforming to a known http or the like, or two-way communication conforming to WebSocket or the like. In response to a request from each of the display devices 300, the two-way communication WEB server 20 provides the display device 300 with the display data generated by the data generation unit 18 of the application server 10. In the case where the data update management unit 12 of the application server 10 determines that the display data is to be updated, the two-way communication WEB server 20 provides the display devices 300 with the display data generated by the data generation unit 18, regardless of the requests from the display devices 300.

The two-way communication WEB server 20 includes a data storage unit (first data storage unit) 22. The data storage unit 22 stores an html file including a script and display data. In an html file, the script for WebSocket (two-way communication), the script for acquiring the information relating to the display devices 300 and the like are described. An html file includes display data of a simple screen image, and the like. The two-way communication WEB server 20 transmits, in response to a request from each of the display devices, an html file stored in the data storage unit 22 to the concerned display device 300.

Each of the display data providing apparatus 100 and the numerical controller 200 (excluding the storage parts) is configured with an operation processor, for example, a DSP (digital signal processor) or an FPGA (field-programmable gate array). Various types of functions of the display data providing apparatus 100 and the numerical controller 200 are realized when, for example, predetermined software (program, application) stored in the storage parts is executed. The various types of functions of the display data providing apparatus 100 and the numerical controller 200 may be realized by cooperation of hardware and software.

Each of the data storage unit 14 and the data storage unit 22 is a rewritable memory such as EEPROM or a rewritable disk such as HDD (hard disk drive) or SSD (solid state drive).

Figure 2:
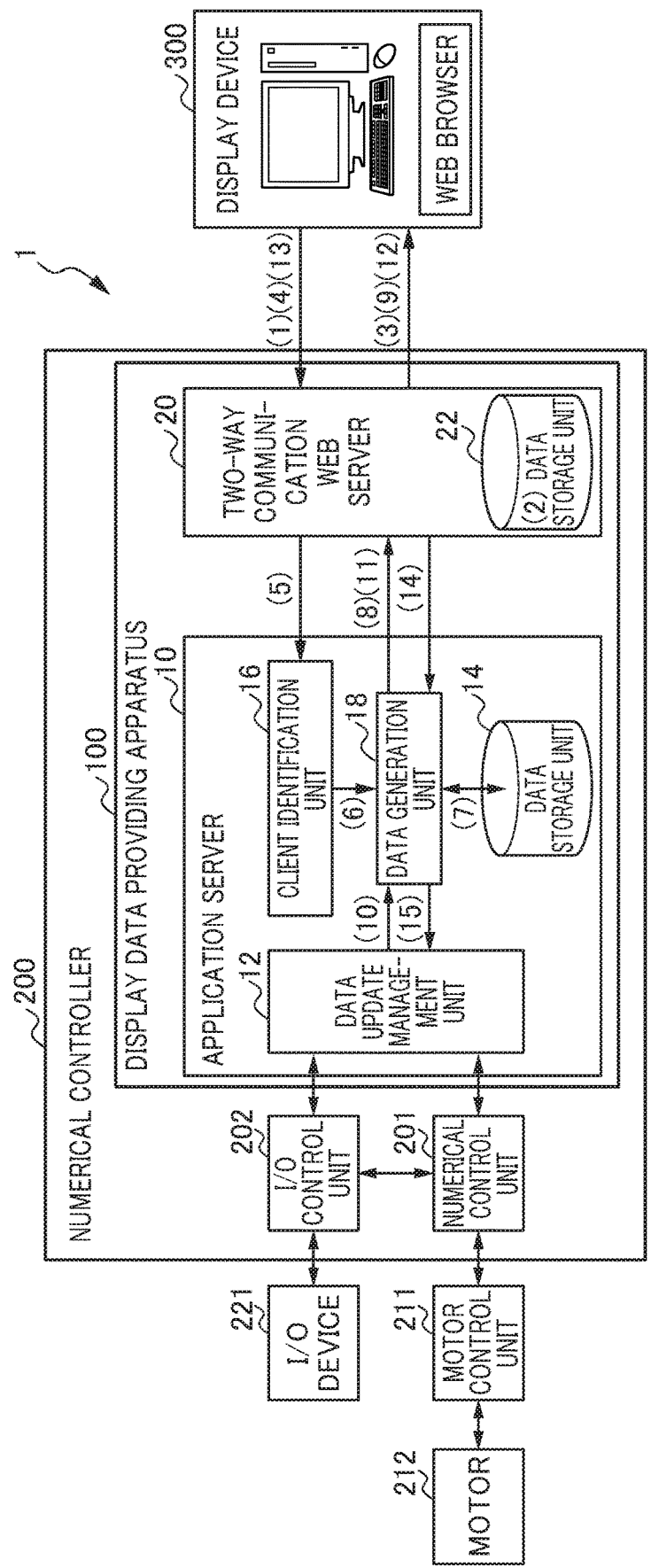
FIG. 2 is a diagram illustrating operation of the display data providing system including the display data providing apparatus according to the present embodiment.

The operation of the display data providing system including the display data providing apparatus according to the present embodiment is described below, by referring to FIG. 2. FIG. 2 is a diagram illustrating the operation of the display data providing system including the display data providing apparatus according to the present embodiment. It is noted that, in FIG. 2, only one of the three display devices 300 shown in FIG. 1 is illustrated for convenience of explanation.

(Establishment of Two-Way Communication)

(1) First, the display device 300 accesses the two-way communication WEB server 20 by use of the URL (uniform resource locator) input to the WEB browser.

(2) The two-way communication WEB server 20 refers to the html files containing scripts and display data stored in the data storage unit 22, and (3) transmits the html file corresponding to the requested URL, to the display device 300. As described above, the script for WebSocket (two-way communication), the script for acquiring the information relating to the display device 300, and the like are described in an html file. An html file includes display data of a simple screen image, and the like.

The display device 300 then analyzes the script for WebSocket described in the received html file, recognizes WebSocket (two-way communication), and establishes the connection between the display device 300 and the two-way communication WEB server 20 (that is, the communication is switched from the one-way communication conforming to http to the two-way communication conforming to WebSocket). The display device 300 displays the display data of the screen image included in the received html file, on the WEB browser.

(4) The display device 300 then analyzes the script (script for acquiring the information relating to the display device)

described in the received html file, and transmits data for client identification (OS type, display size, MAC address, etc.) to the two-way communication. WEB server 20.

(5) The two-way communication WEB server 20 transmits the received data for client identification to the application server 10.

(6) The client identification unit 16 of the application server 10 identifies the type of the display device 300 on the basis of the data for client identification, and transmits the identification result to the data generation unit 18.

(7) The data generation unit 18 generates the display data suitable for the type of the display device 300 identified by the client identification unit 16, on the basis of the display data relating to the numerical controller 200, specifically, the numerical control data of the numerical control unit 201 and the I/O data of the I/O control unit 202, and the script file stored in the data storage unit. 14.

(8) The application server 10 transmits the generated display data to the two-way communication WEB server 20.

(9) The two-way communication. WEB server 20 transmits the generated display data to the display device 300. The display device 300 thereby displays the received display data on the WEB browser.

(From WEB Server to Display Device)

(10) The data update management unit 12 of the application server 10 periodically acquires the display data relating to the numerical controller 200, specifically, the numerical control data of the numerical control unit 201 and the I/O data of the I/O control unit 202. As described above, the numerical control data (display data) includes the information relating to the operation of the numerical controller 200, more specifically, at least one of the control parameters (for example, number of axes, names of respective axes, setting of acceleration/deceleration of respective axes) of the numerical control unit 201, the distributed pulse from the numerical control unit 201 to the motor 212 of the machine, the feedback pulse from the motor 212 of the machine to the numerical control unit 201, and the abnormality notification alarm of the numerical control unit. 201. The I/O data (display data) includes the information relating to the operation of the numerical controller 200, more specifically, the input/output signals of the PMC in the I/O control unit 202.

The data update management unit 12 determines whether to update the acquired display data, specifically, the numerical control data and the I/O data, for each connection with the display device 300. In the case where the display data is determined to be updated, for example, in the case where the data update management unit 12 compares the latest display data with the display data transmitted last time to the display device 300, and where the display data has been changed, the data update management unit 12 transmits the display data (the numerical control data and the I/O data) to the data generation unit 18.

(11) The data generation unit 18 generates the display data, by processing the received display data, specifically, the numerical control data and the I/O data. In this case, the data generation unit 18 may process the display data on the basis of the script file stored in the data storage unit 14, or may process the display data so as to suit the type of the display device identified by the client identification unit 16. The application server 10 transmits the generated display data to the two-way communication WEB server 20.

(12) The two-way communication WEB server 20 transmits the received display data to the display device 300. As described above, in the case where the data update management unit 12 determines that the display data is to be updated, the two-way communication WEB server 20 provides the display data generated and updated by the data generation unit 18 to the display device 300, regardless of the request from the display device 300.

(From Display Device to WEB Server)

(13) The display device 300 transmits a key operation performed on the screen of the WEB browser, an input value, data acquirable by the script of the display device 300, or a request. The two-way communication WEB server 20 may transmit the display data stored in the data storage unit 22 to the display device 300, in immediate response to the request.

(14) Alternatively, the two-way communication WEB server 20 may transmit the key operation, the input value, the data acquirable by the script of the display device or the request to the application server 10, and the data generation unit 18 of the application server 10 may execute processing respectively corresponding.

(15) In an example, the data generation unit 18 may process the data from the two-way communication WEB server 20 into the data of the numerical controller 200, for example, the numerical control data or the I/O data available to the numerical control unit 201 or the I/O control unit 202, and thereafter may transmit the processed data to the data update management unit 12, may store the data in the data storage unit 14, or may transmit the data to the two-way communication WEB server 20.

In http, just one request is allowed to be transmitted for each connection, and when a response is received, the connection is cut off. Therefore, http is not suitable for the processing to be periodically executed at a high speed.

Further, a request is allowed to be transmitted only from a browser side. On the other hand, in WebSocket, a request is allowed to be transmitted from both a server side and a browser side once the connection therebetween is established (two-way communication).

As described above, in the display data providing apparatus 100 according to the present embodiment, the data update management unit 12 of the application server 10 determines whether to update the display data. In the case where the data update management unit 12 determines that the display data is to be updated, the data generation unit 18 of the application server 10 generates the display data, and the two-way communication. WEB server 20 performs two-way communication with the display device 300, and provides the display data generated by the data generation unit 18 to the display device 300, regardless of the request from the display device 300.

This operation allows the two-way communication WEB server 20 to transmit the display data to the display device 300, only in the case where the display data relating to the numerical controller 200 is to be updated, and the display contents (screen image) of the WEB browser of the display device 300 are allowed to be updated. Accordingly, unnecessary data transmission is suppressed in the display data providing apparatus 100, thereby enabling to reduce a communication load. In other words, a load on the network is able to be reduced. As a result, the display data relating to the numerical controller is able to be reflected on the WEB browser of the display device at a higher speed.

(Modification)

Figure 3:
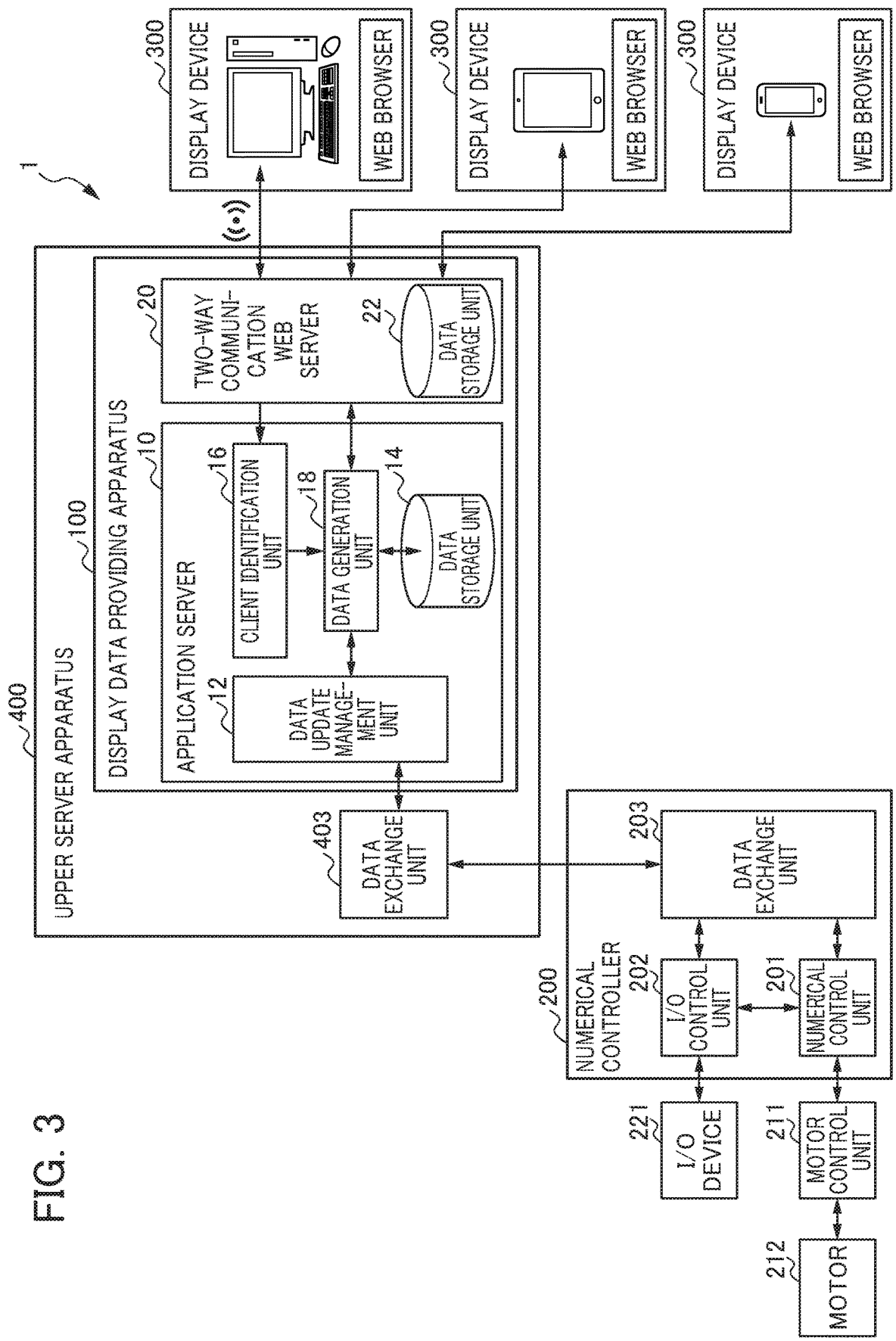
FIG. 3 is a diagram illustrating a configuration of a display data providing system including a display data providing apparatus according to a modification of the present embodiment.
Figure 4:
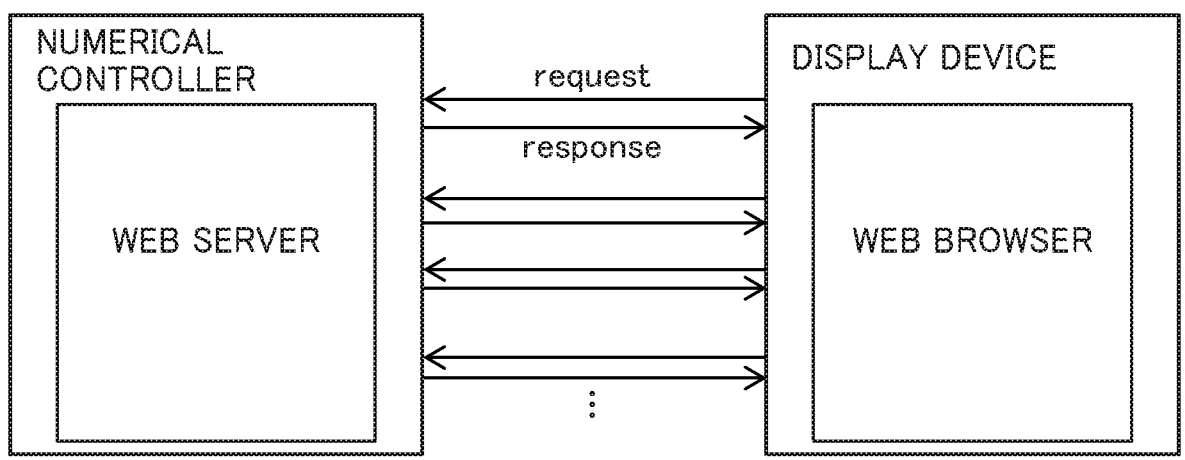
FIG. 4 is a diagram illustrating a configuration of a display data providing system including a conventional display data providing apparatus (WEB server).

In the present embodiment, the display data providing apparatus 100 is provided in the numerical controller 200 (a controller of a machine). In the case where, as shown in FIG. 3, an upper server apparatus 400 is provided between the numerical controller 200 and each of the display devices 300, the display data providing apparatus 100 may be provided in the upper server apparatus 400 provided outside the numerical controller 200. In this case, the numerical controller 200 and the upper server apparatus 400 may correspondingly and respectively include a data exchange part 203 and a data exchange part 403, so as to exchange data.

With such a configuration, even in the case of a plurality of display devices each on which targeted information of the numerical controller is to be confirmed, the numerical controller is required to have only one connection, thereby enabling to reduce the communication load in the numerical controller.

The embodiment according to the present invention has been described so far. The present invention is not limited to the embodiment described above. Various types of changes and deformation are available. In an example, although the display data providing apparatus in the embodiment described above 1s configured to provide the display data relating to the controller of the machine to three display devices, the present embodiment described above is applicable to a display data providing apparatus configured to provide the display data relating to the controller of a machine to one or a plurality of display devices.

In the embodiment described above, the display data providing apparatus is configured to provide the display devices with the display data relating to the numerical controller configured to control a machine such as a machine tool or a robot. The present embodiment is not limited thereto. The present embodiment is applicable to a display data providing apparatus configured to provide a display device with display data relating to various types of controllers configured to control various types of machines.

EXPLANATION OF REFERENCE NUMERALS

1 DISPLAY DATA PROVIDING SYSTEM
10 APPLICATION SERVER
12 DATA UPDATE MANAGEMENT UNIT
14 DATA STORAGE UNIT
16 CLIENT IDENTIFICATION UNIT
18 DATA GENERATION UNIT
20 TWO-WAY COMMUNICATION WEB SERVER
22 DATA STORAGE UNIT
100 DISPLAY DATA PROVIDING APPARATUS
200 NUMERICAL CONTROLLER
201 NUMERICAL CONTROL UNIT
202 I/O CONTROL UNIT
211 MOTOR CONTROL PART
212 MOTOR
221 I/O DEVICE
203 DATA EXCHANGE PART
300 DISPLAY DEVICE
400 UPPER SERVER APPARATUS
403 DATA EXCHANGE PART

What is claimed is:

1. A display data providing apparatus connected to a display device having a WEB browser, the display data providing apparatus configured to provide display data relating to a machine controller to the display device, the display data providing apparatus comprising:
an application server configured to generate the display data; and
a two-way communication WEB server configured to provide the display data generated by the application server to the display device, in response to a request from the display device, the two-way communication WEB server configured to perform two-way communication with the display device,
wherein the application server includes:
a memory configured to store a program; and
a processor configured to execute the program and control the application server to:
continually determine whether to update the display data; and
generate the display data in a case where the display data is determined to be updated,
wherein in the case where the display data is determined to be updated, the two-way communication WEB server automatically provides the display data generated to the display device, regardless of the request from the display device and regardless of the location of the display device,
wherein the display data includes information relating to operation of the machine controller.

2. The display data providing apparatus according to claim 1, wherein the two-way communication WEB server conforms to Web Socket.

3. The display data providing apparatus according to claim 1, wherein the processor is further configured to execute the program and control the application server to determine that the display data is to be updated in a case where the display data is changed.

4. The display data providing apparatus according to claim 1, the processor is further configured to execute the program and control the application server to:
identify the display device on a basis of information relating to the display device acquired from the display device,
wherein the display data suitable for a type of the display device identified is generated, for each of a plurality of display devices.

5. The display data providing apparatus according to claim 1, which is provided in the machine controller, or in a remote server apparatus provided separate from the machine controller which is between the machine controller and the display device and with which the machine controller exchanges data.

* * * * *